(12) United States Patent
Mittal et al.

(10) Patent No.: US 11,721,823 B2
(45) Date of Patent: Aug. 8, 2023

(54) FLOW BATTERY MODULE

(71) Applicant: Delectrik Systems Private Limited, Gurgaon (IN)

(72) Inventors: Vishal Onkarmal Mittal, Gurgaon (IN); Sunil Bhat, Faridabad (IN); Mainpal Singh, Gurgaon (IN)

(73) Assignee: Delectrik Systems Private Limited, Gurgaon (IN)

( * ) Notice: Subject to any disclaimer, the term of this patent is extended or adjusted under 35 U.S.C. 154(b) by 66 days.

(21) Appl. No.: 17/309,972

(22) PCT Filed: Dec. 6, 2019

(86) PCT No.: PCT/IB2019/060514
§ 371 (c)(1),
(2) Date: Jul. 7, 2021

(87) PCT Pub. No.: WO2020/144509
PCT Pub. Date: Jul. 16, 2020

(65) Prior Publication Data
US 2022/0085396 A1    Mar. 17, 2022

(30) Foreign Application Priority Data
Jan. 8, 2019   (IN) .............................. 201911000927

(51) Int. Cl.
*H01M 8/04955*    (2016.01)
*H01M 8/04186*    (2016.01)
(Continued)

(52) U.S. Cl.
CPC ... *H01M 8/04955* (2013.01); *H01M 8/04029* (2013.01); *H01M 8/04074* (2013.01);
(Continued)

(58) Field of Classification Search
CPC ......... H01M 8/04955; H01M 8/04186; H01M 8/04201; H01M 8/04582; H01M 8/04753; H01M 8/188; H01M 8/0432
See application file for complete search history.

(56) References Cited

U.S. PATENT DOCUMENTS

2003/0022031 A1 * 1/2003 Manery ............. H01M 8/04302
429/7
2013/0011704 A1 * 1/2013 Horne .................... H01M 8/20
320/128
(Continued)

FOREIGN PATENT DOCUMENTS

CN      207320236 U    *  5/2018
CN      114335648 A    *  4/2022
(Continued)

*Primary Examiner* — Amanda C. Walke
(74) *Attorney, Agent, or Firm* — Avek IP, LLC

(57) ABSTRACT

The present disclosure provides a flow battery module for improving energy efficiency of flow battery during dynamic load conditions. The flow battery module comprises a plurality of stacks connected in any or a combination of parallel and series. One or more pumps are configured to circulate electrolyte to the stack where ion exchange between the electrolyte occurs and a current is generated. A series of switches are configured between the flow battery and an external load or source. Based on the load or charging power stacks can be electrically and fluidically isolated thereby decreasing parasitic power consumption and self-discharge current, and as a result improving energy efficiency.

10 Claims, 5 Drawing Sheets

(51) Int. Cl.
*H01M 8/04082* (2016.01)
*H01M 8/04537* (2016.01)
*H01M 8/04746* (2016.01)
*H01M 8/18* (2006.01)
*H01M 8/249* (2016.01)
*H01M 8/04007* (2016.01)
*H01M 8/04029* (2016.01)

(52) U.S. Cl.
CPC ... *H01M 8/04186* (2013.01); *H01M 8/04201* (2013.01); *H01M 8/04582* (2013.01); *H01M 8/04753* (2013.01); *H01M 8/188* (2013.01); *H01M 8/249* (2013.01)

(56) References Cited

U.S. PATENT DOCUMENTS

2017/0229729 A1* 8/2017 Elliott ................... H01M 8/24
2018/0175438 A1* 6/2018 Modderno ........ H01M 8/04186

FOREIGN PATENT DOCUMENTS

WO    WO-2016070794 A1 *   5/2016    ........ H01M 8/04313
WO    WO-2020144509 A1 *   7/2020    ........ H01M 8/04186

\* cited by examiner

FLOW BATTERY MODULE

CROSS-REFERENCE TO RELATED APPLICATIONS

This application is the U.S. national phase of, and claims priority to, International Application No. PCT/IB2019/060514, filed Dec. 6, 2019, which designated the U.S. and which claims priority to Indian Application No. 201911000927, filed Jan. 8, 2019.

TECHNICAL FIELD

The present disclosure relates generally to the field of flow batteries. In particular, the present disclosure relates to optimising flow battery operation to improve energy efficiency.

BACKGROUND

Background description includes information that may be useful in understanding the present invention. It is not an admission that any of the information provided herein is prior art or relevant to the presently claimed invention, or that any publication specifically or implicitly referenced is prior art.

Flow Battery (FB), also known as Redox Flow Battery is an energy storage system which stores energy in the form of chemical energy and converts it into electrical energy by a reduction-oxidation (redox) reaction. In a FB, the energy is stored and determined based on the amount and concentration of electrolyte present in the system which is stored in external tanks. Here, no electro-deposition or loss in electroactive substances takes place when the battery is repeatedly cycled, thereby significantly increasing its lifetime, compared to conventional solid-state batteries.

The FB system comprises of three key elements: the electrolyte, which determines the amount of energy in the system is typically stored in two separate tanks, consisting of a positive electrolyte or catholyte and negative electrolyte or the anolyte; the stack, which determines the power of the system and consists of one or more cells typically connected electrically in series and fluidically in parallel; and the Balance of Plant (BOP), which includes other components such as pumps which feed the electrolyte from the tanks to the stack, plumbing through which the electrolyte flows and a battery management system consisting of sensors, control circuit for the overall system.

Of particular interest are the all-vanadium redox flow batteries (VRFBs). In this type of flow battery, the positive electrolyte contains $VO_2^+$ ions which undergo a reduction reaction to $VO^{2+}$ plus electricity during its discharge cycle. The opposite oxidation reaction takes place during the charging of the battery, where $VO^{2+}$ ion plus electricity are oxidised back to $VO_2^+$ ions. In the negative electrolyte $V^{2+}$ ions undergo an oxidation reaction to yield $V^{3+}$ ions plus electricity during its discharge cycle. During the charging cycle $V^{3+}$ ions plus electricity in the negative electrolyte is reduced back to $V^{2+}$ ions.

Typically, in FBs the energy is contained in the electrolyte stored in the tanks and power is generated by the electrochemical reaction in the cell or the stack. During operation, the electrolyte from the tanks is circulated into the stack using pumps. During both charging and discharging of the battery the pumps have to be operational. The electrical power consumption of the pumps adds to the efficiency loss of the battery. Once the pumps are stopped, the stacks in the FB cannot generate any power. In order to keep the battery active, the pumps are always operational. Such operation leads to parasitic power consumption. Further, when the electrolyte flows through the stack there is energy lost in the stack due to diffusion of ions across the membrane and shunt current. The total such loss is also called as self-discharge loss, further decreasing the overall efficiency of the battery system.

Options such as use of variable speed pump have been explored where the pump speed can be reduced during idling to reduce energy loss. However, this only minimizes loss to a certain extent.

There is therefore a requirement in the art for a management system for the operation of flow batteries to minimise losses during operation and improve energy efficiency of the flow batteries.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS

A general object of the present disclosure is to provide a flow battery management module.

Another object of the present disclosure is to provide a flow battery management module to reduce energy loss.

Another object of the present disclosure is to provide a flow battery management module which operates with improved energy efficiency even when the charge power or discharge load is lower than what is rated for the flow battery.

Another object of the present disclosure is to provide a flow battery management module for dynamic load conditions.

SUMMARY

The present disclosure relates generally to the field of flow batteries. In particular, the present disclosure relates to optimising flow battery operation to improve efficiency.

In an aspect, the present disclosure provides a flow battery module comprising: a plurality of stacks; an external circuit element electrically coupled to the plurality of stacks; a current sensor; an isolation switch configured between each of the plurality of stacks and the external circuit element; and a control unit.

In another aspect, each of the plurality of stacks is fluidically coupled to a reservoir adapted to hold a negative electrolyte and to a reservoir adapted to hold a positive electrolyte, wherein the negative electrolyte and the positive electrolyte is circulated through each of the plurality of stacks.

In another aspect, the current sensor is disposed between the plurality of stacks and the external circuit element and is configured to detect magnitude and direction of current flowing from the plurality of stacks.

In another aspect, the control unit is configured to: operate the isolation switch; and control the circulation of the electrolytes.

In another aspect, the isolation switch between the external circuit element and one or more of the plurality of stacks is operated based on at least one operating parameter of the flow battery module determined from magnitude and direction of current flow from the plurality of stacks.

In another aspect, circulation of the negative electrolyte and the positive electrolyte in each of the one or more of the plurality of stacks is controlled, wherein the control unit operates to reduce energy loss in the flow battery module.

In an embodiment, each of the negative electrolyte and the positive electrolyte is allowed to flow into each of the plurality of stacks through a manifold, said each manifold comprising a plurality of valves, wherein each of the plurality of valves is fluidically coupled to one stack of the plurality of stacks.

In another embodiment, the flow battery module comprises at least two pumps, a first pump configured to circulate the negative electrolyte and a second pump configured to circulate the positive electrolyte.

In another embodiment, the flow battery module comprises a pump each for the negative electrolyte and the positive electrolyte, and for each of the plurality of stacks.

In another embodiment, the external circuit element is a load. In another embodiment, an operating parameter of the flow battery module is the number of stacks to be active to enable the flow battery module to supply the power to the load. In another embodiment, the control unit is configured to operate the isolation switch between the external circuit element and one or more of the plurality of stacks based on the operating parameter. In another embodiment, the control unit is further configured to allow circulation of the negative electrolyte and the positive electrolyte to the one or more of the plurality of stacks to enable the flow battery module to supply the power to the load.

In another embodiment, the external circuit element is a source. In another embodiment, an operating parameter of the flow battery module is the number of stacks to be active to enable the flow battery module to receive the power from the source. In another embodiment, the control unit is configured to operate the isolation switch between the external circuit element and one or more of the plurality of stacks based on the operating parameter. In another embodiment, the control unit is further configured to allow circulation of the negative electrolyte and the positive electrolyte to the one or more of the plurality of stacks to enable the flow battery module to receive the power from the source.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

DETAILED DESCRIPTION

Figure 1:
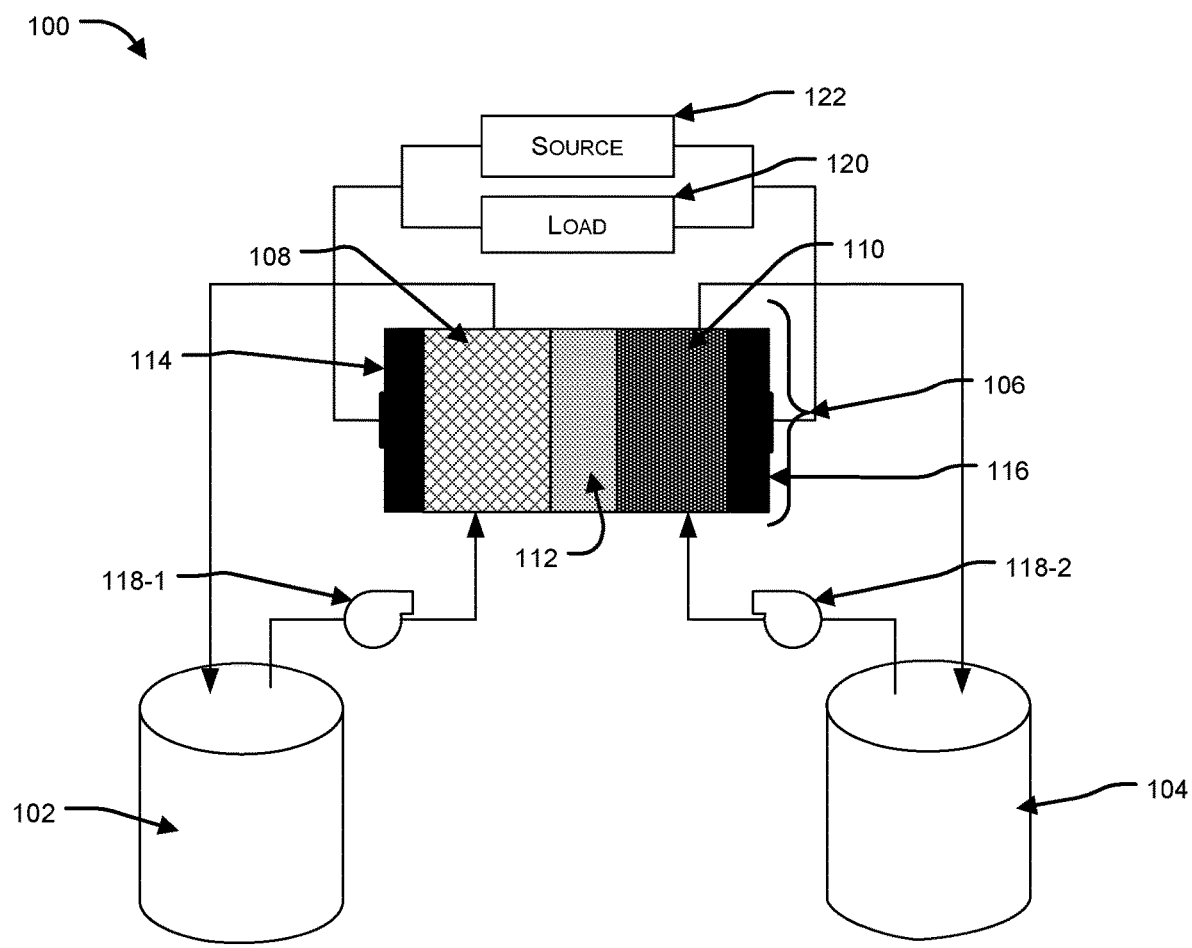
FIG. 1 illustrates a typical representation of a flow battery unit, as known in the art.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Embodiments described herein relate generally to the field of flow batteries and, in particular they relate to optimising flow battery operation to improve energy efficiency.

FIG. 1 illustrates a typical representation of a flow battery unit, as known in the art. In an aspect, the flow battery unit 100 (hereinafter, also referred to as "battery") broadly comprises: a tank 102 containing a negative electrolyte; a tank 104 containing a positive electrolyte; and an electrochemical cell 106 (hereinafter, also referred to as "cell"). In an embodiment, the tanks 102, 104 are fluidically coupled to the cell 106.

In another aspect, the cell 106 comprises a negative electrode 108 and a positive electrode 110. In an embodiment, the negative electrode 108 and the positive electrode 110 can be porous and each can be adapted to allow the negative electrolyte and positive electrolyte to flow through it respectively. In another embodiment, the negative electrode 108 and positive electrode 110 can be separated by a membrane 112. In another embodiment, the membrane 112 can be an ion exchange membrane or a microporous separator.

In another embodiment, the electrodes 108, 110 and membrane 112 assembly can be sandwiched between a negative bipolar plate 114 and a positive bipolar plate 116.

In an aspect, the electrolyte can be pumped from the tanks 102, 104 into the cell 106 by two or more pumps. Typically, a separate pump 118-1, 118-2 are used to pump negative electrolyte and positive electrolyte respectively.

In another aspect, during operation, the electrolytes are continuously circulated through the cell 106. Ion exchange occurs between the negative electrolyte and the positive electrolyte through the membrane 112, and electron transfer occurs from the electrodes 108, 110 to the bipolar plates 114, 116.

In another aspect, the bipolar plates 114, 116, in turn, are connected to an external load 120 (during battery discharge) or an external source 122 (during battery charge).

Figure 2:
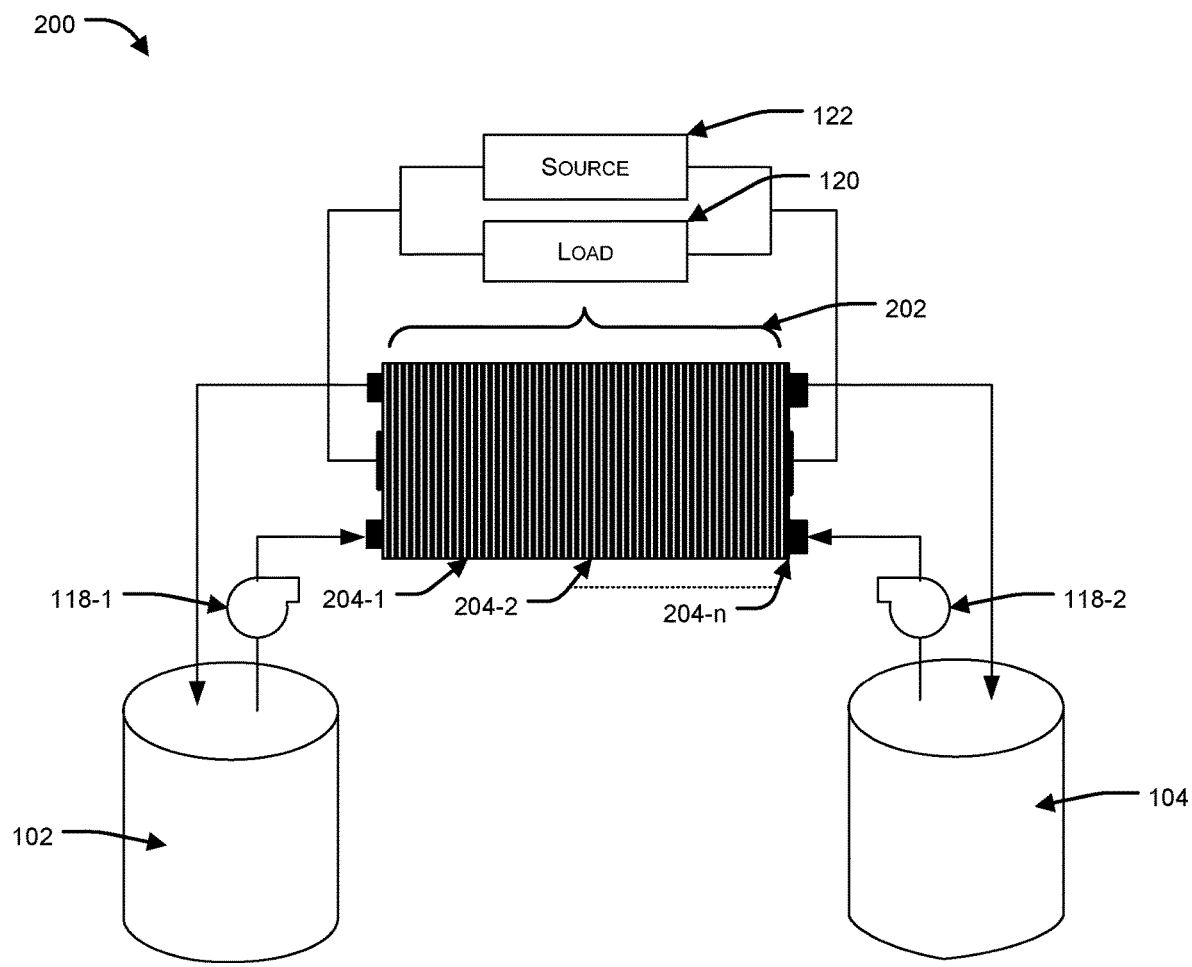
FIG. 2 illustrates a typical representation of a flow battery unit with a single stack, as known in the art.

FIG. 2 illustrates a typical representation of a flow battery unit with a single stack, as known in the art. In an aspect, the stack 202 in the battery unit 200 (hereinafter, also referred to as "battery") refers to one or more electrochemical cells 204-1, 204-2 . . . 204-n (hereinafter, also referred to as "cells" and collectively designated 204). Typically, the stack 202 is configured to have the cells 204 connected electrically in series and fluidically in parallel.

In an aspect, the pumps 118-1, 118-2 feed the negative electrolyte and the positive electrolyte to the negative side of the stack 202 and the positive side of the stack 202 respectively. In another aspect, the configuration and operation of the battery 200 is as described previously for battery 100 in FIG. 1.

In another aspect, using a battery 200 with a stack 202 can have an advantage of being able to be implemented for high energy applications. In another aspect, performance of the battery 200 in terms of energy storage capacity and power output delivered is directly a function of the quantity of electrolyte in the battery 200 and the number and size of cells 204 in the stack 202. Hence, in order to scale the battery 200 to a required capacity, larger tanks containing larger quantities of electrolyte can be used, along with larger size and increased number of cells 204 in the stack 202. A further advantage is that scaling up can be done at a minimum additional cost, as common components are used.

In another aspect, to increase output of the flow battery unit, two or more stacks can be used, connected electrically in series, in parallel or in a combination of both.

Figure 3:
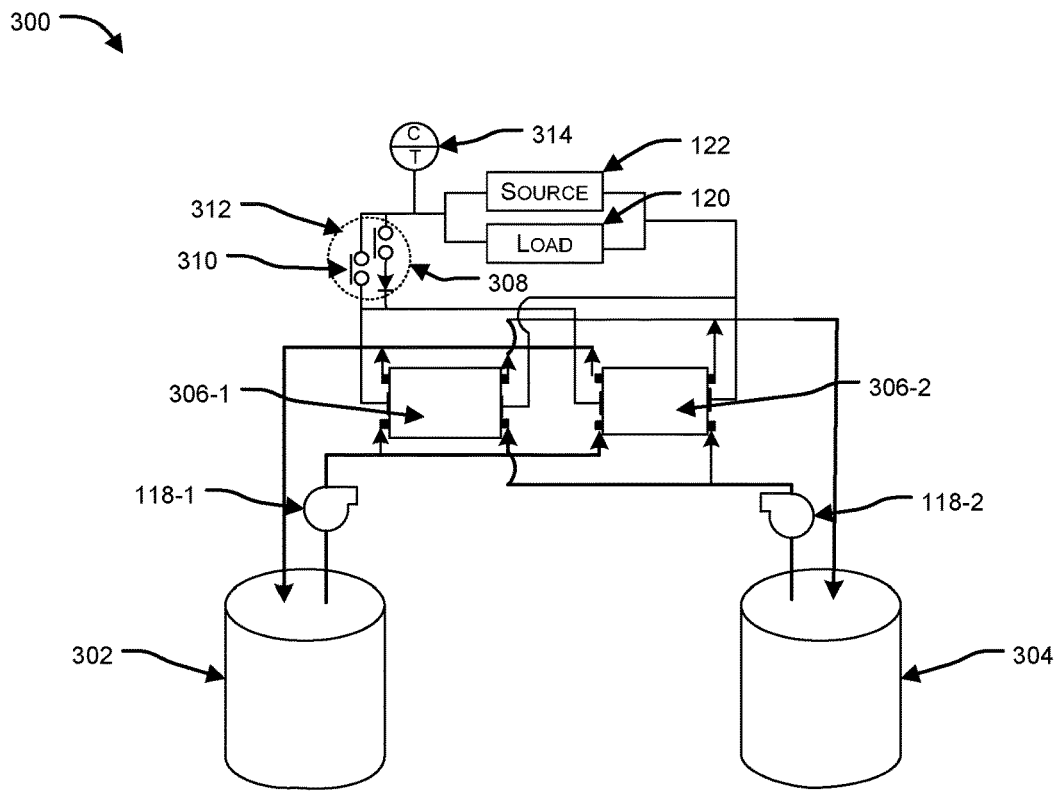
FIG. 3 illustrates a typical representation of a flow battery unit with more than one stack electrically connected in parallel, as known in the art.

FIG. 3 illustrates a typical representation of a flow battery unit with more than one stack electrically connected in parallel, as known in the art. In an aspect, the flow battery unit 300 (hereinafter, also referred to as "battery") broadly comprises: a tank 302 containing a negative electrolyte; a tank 304 containing a positive electrolyte; and two or more stacks 306-1, 306-2 . . . 306-n (hereinafter, collectively designated 306) connected electrically in parallel.

In another aspect, one or more pumps can circulate the negative and positive electrolytes through the stacks 306. In another embodiment, the negative and positive electrolytes can be supplied to the negative side and positive side, respectively of each stack through primary and secondary manifolds.

In another embodiment, the DC voltage output of each stack is determined by the number of electrochemical cells in the stack. Since the stacks 306 are connected in parallel, the number of stacks determines the power output of the flow battery unit at the same DC voltage of each stack.

In an embodiment, two electrical switches are connected to each stack, wherein one of the switches is connected further in series with a diode such that current flow is allowed only in the direction of load. The switch in series with the diode can be referred to as "float switch" 308 while the other switch can be referred to as "main switch" 310. The combination of the main switch and the float switch together can be referred to as "state-change switch" 312. Table 1 below shows the states of the switches during operation of the flow battery unit.

TABLE 1

Switch states during flow battery operation.

| | Main Switch | Float Switch |
|---|---|---|
| Charge | Close | Close |
| Discharge | Close | Close |
| Float | Open | Close |

In another exemplary implementation a current sensor 314 can be used to determine the direction and magnitude of current from or to the flow battery.

In another aspect, typically, in flow battery units, the energy is a function of the quantity of electrolyte in the system. In order to generate power, the electrolyte is continuously circulated in the flow battery. Once the circulation of electrolyte is stopped, the flow battery unit is no longer active.

In applications where load can be dynamic, the pumps are constantly operated to keep the flow battery unit active. However, this implies that even when there is no load, the pumps are still operational, which can lead to parasitic power consumption. Further, during circulation of electrolyte under no load condition, energy is lost in the stack due to diffusion of ions across the membrane and shunt current. This loss of energy is referred to as "self-discharge loss".

In another aspect, voltage efficiency of a flow battery unit is given by $\eta_V = V_d/V_c$, where $V_d$ is the average discharge voltage and $V_c$ is the average charge voltage. Here, efficiency loss can be due to the irreversibility of the ohmic losses in the battery, primarily in the membrane and the electrode and adjacent interfacial resistances.

In another aspect, Faradaic efficiency or current efficiency of the flow battery unit is given by $\eta_F = Q_d/Q_c$, where $Q_d$ is the total charge delivered to the load by the battery during discharge and $Q_c$ is the total charge received by the battery during charging.

In another aspect, overall efficiency of the above described flow battery unit is given by $\eta_E = \eta_V \times \eta_F$.

Figure 4:
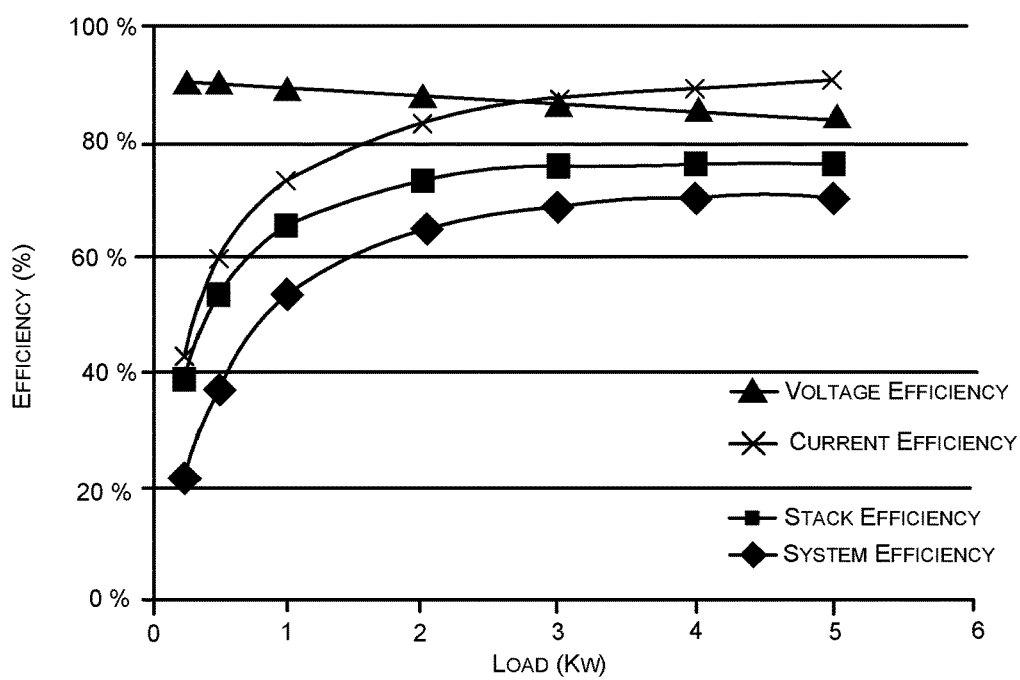
FIG. 4 illustrates a typical representation of charge-discharge cycle efficiency of a flow battery as a function of connected load.

FIG. 4 illustrates a typical representation of charge-discharge cycle efficiency of a flow battery as a function of connected load. In an aspect, the battery parameters considered are, No of Cells in a Stack: 36
No of Pumps: 2
Pump Power Consumption: 0.1 kW
Load: 5 kW
Charge Current: 150 A
Self-Discharge Current: 6.3 A
Equivalent Series Resistance: 34 mohm As can be observed from FIG. 4, the voltage efficiency decreases as load increases, and the current efficiency increases as load increases. The overall stack efficiency, which is a product of voltage and current efficiencies is low at low loads. The overall system efficiency, which also includes power loss due to pumps is also low at low loads. The loss in efficiency for the above described flow battery 300 for the above-mentioned parameters is >10% for loads <1.25 KW, i.e., at <25% of rated load of the flow battery 300.

In an aspect, decreased load here can imply low load during discharge of the flow battery. It can also imply a low source current while charging the flow battery.

In another embodiment, one or more stacks of the flow battery unit can be further electrically isolated from the flow battery unit to minimise self-discharge loss. This isolation can be achieved using DC contactors in the system between the electrical circuit connecting the stack and the load/source.

In another embodiment, once the electrical isolation has been achieved, the electrically isolated one or more stacks can be further fluidically isolated to minimise parasitic power consumption. The electrical and fluidic de-coupling of one or more stacks based on low load or low source current can improve the energy efficiency of the flow battery.

In an embodiment, one or more stacks in the flow battery can be electrically isolated during operation, without a need to stop the flow battery. Such electrical isolation can be achieved using DC contactors in the system between the electrical circuit connecting the stack and the load/source.

In another embodiment, once the one or more stacks are electrically isolated, further fluidic isolation can also be achieved by stopping the supply of positive and negative electrolyte to the stacks. This can be achieved using independent pumps for each stack. In case common pumps are used fluidic disconnect can be achieved through electrically operated valves at the stack inlet.

In another embodiment, when the power requirement exceeds the limit of the active stack, the isolated stacks are reconnected, first by restoring the fluidic connection and then by restoring the electrical connection.

In another embodiment, once the flow battery is fully charged, one or more of the stacks can be electrically isolated while the flow battery is still active. Further, the electrically isolated stacks can be fluidically isolated as well, thereby decreasing parasitic power loss due to pump operation and self-discharge loss In an exemplary implementation, the actuation of the electrical switches, the electrically operated valves and the pumps can be accomplished through the use of a control unit. The control unit can comprise one or more sensors to measure the charge and discharge current of the flow battery at a given point of time and a processor which determines the optimum number of stacks that can be active, or the number of stacks that can be electrically and fluidically isolated in order to reduce loss in energy efficiency.

Embodiments described hereunder provide a control unit to selectively isolate, either electrically, fluidically or both, one or more stacks of cells in a battery flow unit during operation, thus conserving energy by minimising parasitic power consumption and self-discharge loss and leading to an improvement in the energy efficiency of the battery unit.

Figure 5:
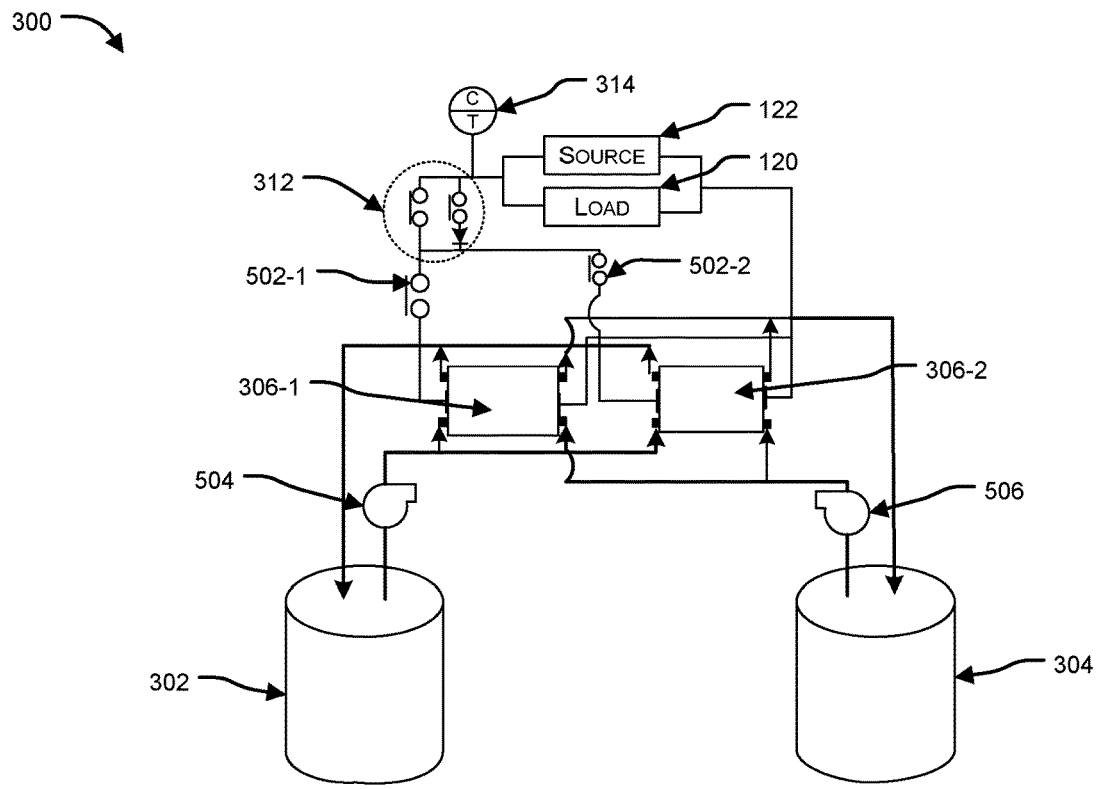
FIG. 5 illustrates an exemplary representation of a flow battery unit integrated with the proposed control unit, in accordance with embodiments of the present disclosure.

FIG. 5 illustrates an exemplary representation of a flow battery unit integrated with the proposed control unit, in accordance with embodiments of the present disclosure. In an embodiment, the flow battery unit 300 (hereinafter, also referred to as "battery") broadly comprises: a tank 302 containing a negative electrolyte; a tank 304 containing a positive electrolyte; and two or more stacks 306-1, 306-2 . . . 306-n (hereinafter, collectively designated 306) connected electrically in parallel.

In another embodiment, one or more pumps each can circulate the negative and positive electrolytes through the stacks 306. In another embodiment, the negative and positive electrolytes can be supplied to the negative side and positive side respectively of each stack through primary and secondary manifolds.

In another embodiment, a state-change switch 312 is disposed between the stacks 306 and the external load/source.

In an exemplary implementation, one or more isolation switches 502-1, 502-2 . . . 502-n (hereinafter, collectively designated 502) for each stack in the flow battery unit are connected.

In an embodiment, when the discharge load is lower than the flow battery rating, one or more stacks 306 that are not required can be electrically isolated from the flow battery unit 300 using the one or more isolation switches 502.

In another embodiment, the negative and positive electrolytes are each circulated through a common pump 504, 506 respectively. Fluidic isolation is achieved through electrically operated valves present in the manifold.

Figure 6:
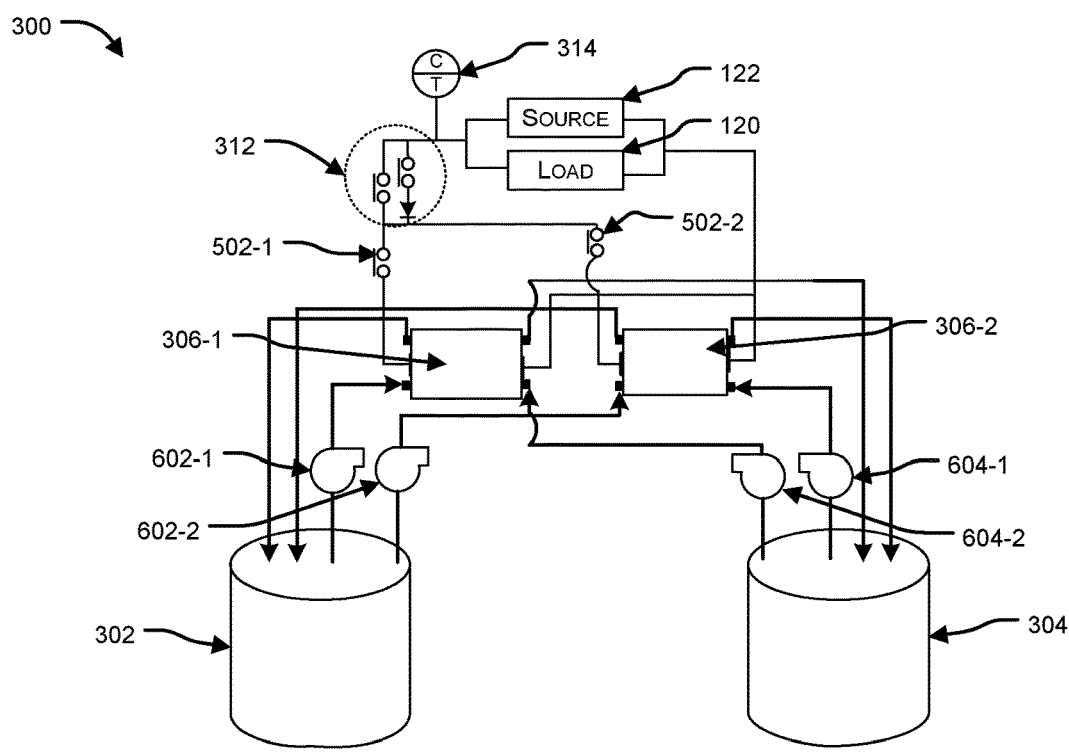
FIG. 6 illustrates another exemplary representation of a flow battery unit integrated with the proposed control unit, in accordance with embodiments of the present disclosure.

FIG. 6 illustrates another exemplary representation of a flow battery unit integrated with the proposed control unit, in accordance with embodiments of the present disclosure. In an embodiment, the flow battery unit 300 (hereinafter, also referred to as "battery") broadly comprises: a tank 302 containing a negative electrolyte; a tank 304 containing a positive electrolyte; and two or more stacks 306-1, 306-2 . . . 306-n (hereinafter, collectively designated 306) of electrochemical cells connected electrically in parallel.

In another embodiment, one or more pumps can circulate the negative and positive electrolytes through the stacks 306. In another embodiment, the negative and positive electrolytes can be supplied to the negative side and positive side respectively of each stack through primary and secondary manifolds.

In an exemplary implementation, one or more isolation switches 502-1, 502-2 . . . 502-n (hereinafter, collectively designated 502) for each stack in the flow battery unit are connected.

In an embodiment, when the discharge load is lower than the flow battery rating, one or more stacks 306 that are not required can be electrically isolated from the flow battery unit 300 using the one or more isolation switches 502.

In another embodiment, the negative electrolyte is fed separately to each stack through two or more pumps 602-1, 602-2 . . . 602-n (hereinafter, collectively designated 602). In another embodiment, the positive electrolyte is fed separately to each stack through two or more pumps 604-1, 604-2 . . . 604-n (hereinafter, collectively designated 604). Here, individual pumps with smaller capacities can be used as they circulate electrolyte to only one stack. Fluidic isolation achieved by selectively switching off two or more pumps can save more power.

Figure 7:
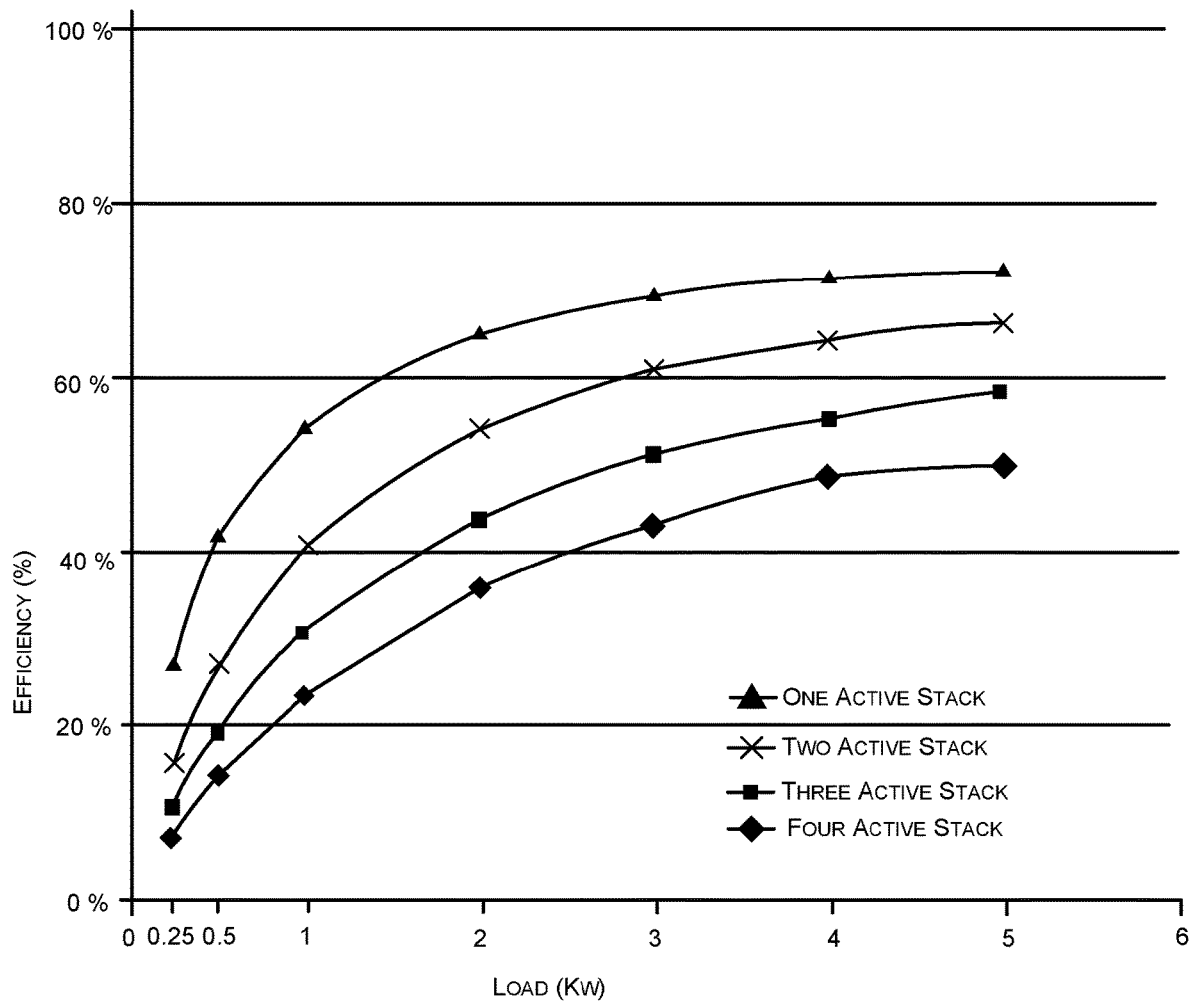
FIG. 7 illustrates an exemplary representation of efficiency of a flow battery with the proposed control unit as a function of connected load.

FIG. 7 illustrates an exemplary representation of system efficiency of a flow battery with the proposed control unit as a function of connected load. In an embodiment, the battery parameters considered are, No of Cells in a Stack: 36
No of Stack in system: 4
No of Pumps: 8 (2 Per Stack)
Pump Power Consumption: 100 Watt
Load Rating per stack: 5 kW (20 KW Total)
Charge Current: 150 A
Self-Discharge Current Stack: 6.3 A
Equivalent Series Resistance Stack: 34 mohm As can be observed, the usual operating mode has four active stacks with efficiency as shown in FIG. 7. At low discharge loads, reducing the number of active stacks significantly improves the energy efficiency. The efficiency of the flow battery unit with a single active stack is about 20% greater than the efficiency of the flow battery unit with all four stacks active. Thus, depending upon the operating condition, the energy loss can be minimised, and energy efficiency can be improved by isolating, electrically and fluidically, a specific number of stacks from the flow battery.

It should be apparent to those skilled in the art that many more modifications besides those already described are possible without departing from the inventive concepts herein. The inventive patient matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practised with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages

The present disclosure provides a flow battery management module.

The present disclosure provides a flow battery management module to reduce energy loss.

The present disclosure provides a flow battery management module which operates with improved energy efficiency even when the charge power or discharge load is lower than what is rated for the flow battery.

The present disclosure provides a flow battery management module for dynamic load conditions.

We claim:

1. A flow battery module comprising:
a plurality of stacks, each of the plurality of stacks fluidically coupled to a reservoir adapted to hold a negative electrolyte and to a reservoir adapted to hold a positive electrolyte, wherein the negative electrolyte and the positive electrolyte are circulated through each of the plurality of stacks;
an external circuit element electrically coupled to the plurality of stacks;
a current sensor disposed between the plurality of stacks and the external circuit element, configured to detect magnitude and direction of current flowing from the plurality of stacks;
an isolation switch configured between each of the plurality of stacks and the external circuit element; and
a control unit configured to:
selectively isolate one or more of the plurality of stacks by operating the isolation switch between the external circuit element and the one or more of the plurality of stacks based on at least one operating parameter of the flow battery module determined from the magnitude and the direction of current flow from the plurality of stacks; and
control the circulation of the negative electrolyte and the positive electrolyte in each of the one or more of the plurality of stacks,
wherein the control unit operates to reduce energy loss in the flow battery module.

2. The flow battery module as claimed in claim 1, wherein each of the negative electrolyte and the positive electrolyte is allowed to flow into each of the plurality of stacks through a manifold, said each manifold comprising a plurality of valves, wherein each of the plurality of valves is fluidically coupled to one stack of the plurality of stacks.

3. The flow battery module as claimed in claim 1, wherein the flow battery module comprises at least two pumps, a first pump configured to circulate the negative electrolyte and a second pump configured to circulate the positive electrolyte.

4. The flow battery module as claimed in claim 1, wherein the flow battery module comprises a pump each for the negative electrolyte and the positive electrolyte, and for each of the plurality of stacks.

5. The flow battery module as claimed in claim 1, wherein the external circuit element is a load.

6. The flow battery module as claimed in claim 5, wherein an operating parameter of the flow battery module is the number of stacks to be active to enable the flow battery module to supply the power to the load.

7. The flow battery module as claimed in claim 6, wherein the control unit is configured to:
operate the isolation switch between the external circuit element and one or more of the plurality of stacks based on the operating parameter; and
allow circulation of the negative electrolyte and the positive electrolyte to the one or more of the plurality of stacks to enable the flow battery module to supply the power to the load.

8. The flow battery module as claimed in claim 1, wherein the external circuit element is a source.

9. The flow battery module as claimed in claim 8, wherein an operating parameter of the flow battery module is the number of stacks to be active to enable the flow battery module to receive the power from the source.

10. The flow battery module as claimed in claim 9, wherein the control unit is configured to:
operate the isolation switch between the external circuit element and one or more of the plurality of stacks based on the operating parameter; and
allow circulation of the negative electrolyte and the positive electrolyte to the one or more of the plurality of stacks to enable the flow battery module to receive the power from the source.

* * * * *